United States Patent [19]

Mango, III

[11] B 3,993,635

[45] Nov. 23, 1976

[54] FLAME RESISTANT POLYSTYRENE

[75] Inventor: Louis A. Mango, III, Louisville, Ky.

[73] Assignee: General Electric Company, Louisville, Ky.

[22] Filed: Dec. 6, 1974

[21] Appl. No.: 530,174

[44] Published under the second Trial Voluntary Protest Program on February 24, 1976 as document No. B 530,174.

[52] U.S. Cl. .............................. 260/42.18; 526/17; 526/27; 526/11.1
[51] Int. Cl.$^2$ ........................ C08F 8/40; C08F 8/24
[58] Field of Search .................. 260/93.5 A, 88.2 S; 450/611, 614

[56] References Cited
UNITED STATES PATENTS 3,008,939  11/1961  Schroeder et al. ............. 260/88.2 S
3,220,989  11/1965  Rolih et al. ..................... 260/88.2 S
3,311,602   3/1967  Roley ............................. 260/93.5 A

FOREIGN PATENTS OR APPLICATIONS 865,331  4/1961  United Kingdom ................ 450/611

Primary Examiner—William F. Hamrock
Attorney, Agent, or Firm—Francis H. Boos

[57] ABSTRACT

A flame-resistant, thermoplastic copolymer of styrene and phosphorylated styrene having a phosphorus group bonded to a phenyl group by an intervening methylene group and being substantially non-crosslinked.

7 Claims, No Drawings

FLAME RESISTANT POLYSTYRENE

BACKGROUND OF THE INVENTION

Hydrocarbon polymers containing aromatic substituents such as polystyrene have poor fire resistance and flame-retarding properties. Such hydrocarbon polymers, when ignited, normally continue burning after ignition and removal of the ignition source. Fire retardancy is the term used to describe the inability of a material to support combustion after removal from the source of ignition. In other words, fire retardant compositions are self extinguishing after removal from a flame used to heat and ignite the same.

It is known that the incorporation of phosphorus atoms as part of the polymeric chain improves the flame retardancy properties of such polymeric materials. Such incorporation of phosphorus is effected by copolymerizing aralkenes with phosphorus compounds containing aliphatic substituents. The polymeric materials resulting from such copolymerization while having fire resistance or flame retardancy properties do not possess the other desirable physical properties such as strength, which is present in hydrocarbon polymers having only carbon-to-carbon bonds in the polymer chain.

It was later discovered, as set forth in U.S. Pat. No. 3,220,989-Rolih, that it is possible to phosphonate aromatic nuclei, having at least one replaceable hydrogen atom on the aromatic nucleus, in hydrocarbon polymers that are substantially free of aliphatic unsaturation derived from the polymerization of polymerizable aralkenes. The nuclear phosphonated hydrocarbon polymers obtained in accordance with that invention possess valuable flame resistance and flame retardant properties, particularly by exhibiting a produced ability to withstand ignition. If ignited by a direct flame application, they do not support combustion, but are immediately self extinguishing on removal of the source of the flame. However, this method results in polymeric chain degradation leading to an undesirably low degree of polymerization of the polymer.

It has been discovered that polystyrene, converted first to a substantially non-crosslinked poly(styrene-chloromethyl styrene) copolymer, may be converted further to a phosphorus-containing derivative exhibiting fire retardancy and without a lowered degree of polymerization of the polymer. The product of this invention is characterized by the presence of an intervening methylene group which bonds the phosphorus to the phenyl group of the polystyrene, as opposed to the product of the Rolih patent which features a direct connection of the phosphorus to the phenyl group of the polystyrene.

SUMMARY OF THE INVENTION

In accordance with this invention, a polymer of styrene and phosphorylated styrene is formed with the phenyl groups being represented by the formula

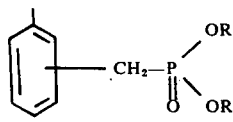

where R is an alkyl group having 1–8 carbon atoms of the group consisting of alkyl and cycloalkyl and at least about 5 wt. pct. phosphorus. The phosphorus is bonded to the phenyl group by an intervening methylene group and the polystyrene copolymer is substantially non-crosslinked.

DETAILED DESCRIPTION OF THE INVENTION

In the method of forming the material of this invention, a chloromethylated or bromomethylated polystyrene is reacted with alkaline metal salt of a dialkyl phosphite at temperatures of reaction in an inert hydrocarbon solvent.

The chloromethylated polystyrene can be formed by any method known in the art. An example method can be found in Griffin D. Jones' "Chloromethylation of Polystyrene," Industrial and Engineering Chemistry, Volume 44, No. 11, P. 2686 (1952). However, the particular chloromethylated polystyrene used in this invention must be a substantially non-crosslinked material. If the chloromethylated polystyrene is generally crosslinked, the resultant product of this invention will be undesirable owing to the fact that said product will have undesirable fabrication properties.

The alkali metal salt of the dialkyl phosphite can be, for example, sodium diethyl phosphite, sodium dipropyl phosphite, sodium di-isopropyl phosphite, sodium dibutyl phosphite, sodium dioctyl phosphite, or the corresponding potassium salts of these materials.

The alkali metal salt of the dialkyl phosphite can be made by reacting an alkali metal with a dialkyl phosphite in the presence of an inert solvent, as is known in the art.

The inert hydrocarbon solvent is preferably an aromatic hydrocarbon having a boiling point less than about 150°C. Example solvents that can be used in this invention are benzene and toluene.

In the preferred method of this invention, a first solution is formed which contains the alkali metal salt of the dialkyl phosphite in an inert solvent. The concentration of the first solution is preferably in a range of about one-quarter to one and one-half molar.

A second solution is formed by admixing the chloromethylated polystyrene with the inert solvent. The concentration of the chloromethylated polystyrene of the second solution is preferably in the range of about one to about 10 wt. pct. Concentrations greater than about 10 wt. pct. are undesirable because the viscosity of the second solution becomes sufficiently high as to cause difficulty in subsequent mixing operations, thereby resulting in waste of time and labor.

The first and second solutions are thereafter admixed and heated to a temperature in the range of about 40 to about 90°C, preferably in the range of about 60°–70°C. Temperatures greater than about 90°C are undesirable because crosslinking will occur and temperatures less than about 40°C are undesirable because of the waste of labor and time in reacting the solutions and the occurrence of undesirable precipitation of the alkyl metal phosphite from the reaction mixture.

The molar ratio of phosphite salt to chloromethyl group concentration should be in the range of 2 to 10 and preferably 2 to 3. Ratios higher than 3 result in unnecessary waste of reagent while those less than 2 leave unreacted chloromethyl groups on the polymer which leads to undesirable crosslinking in later handling and fabrication.

The effect of the molar ratio of reactants on residual chlorine content is shown in Table I.

TABLE I

Effect of Sodium Diethyl Phosphite
To Chloromethyl Ratio on Percent Conversion*

| Phosphorylated Polystyrene | Chloromethylated Polystyrene | Sodium Diethyl Phosphite/Chloromethyl Ratio | % Chlorine Residual |
|---|---|---|---|
| 7 | 11(16.6% Chlorine) | 0.71 | 12.94 |
| 8 | 11 | 1.42 | 8.35 |
| 18 | 16(9.5% Chlorine) | 2.5 | 0.13 |
| 9 | 11 | 3.5 | 0.40 |
| 11 | 14, 15(11.8% Chlorine) | 5.65 | 0.11 |
| 4 | 6(7.7% Chlorine) | 9.1 | nil |

*Conditions 60–70°C in Toluene, 6.5 to 7.0 hours reaction time.

As can be seen, samples 7 and 8, run at phosphite salt to chloromethyl group ratios less than 2, possess considerable amounts of residual chlorine indicating undesired, incomplete reaction. Alternately, samples 9, 11, 4 having ratios above 3, exhibit only small levels of residual chlorine indicative of complete reaction. However, the results of these latter experiments, where large excesses of expensive phosphite salt were used, are no better than the result found in sample 18 where the ratio used (i.e., 2:5) falls in the recommended range. Thus, molar ratios of salt to chloromethyl group above 3 represent an unnecessary expenditure of reagent.

The admixed first and second solutions are reacted at the above desired reaction temperatures for a period of time sufficient for substantial removal of the chlorine from the polymer. This period of time is generally in the range of about 6 to 8 hours at these reaction temperatures.

In another embodiment of this invention, bromomethylated polystyrene may be substituted directly for chloromethylated polystyrene, as set forth above, and using the same recommended levels of reactants.

The resulting mass can thereafter be precipitated from water with vigorous stirring and a two-layer system will form upon standing. The bottom layer, containing extracted salts, is discarded. The top layer, consisting of solvent swollen polymer, can then be added to hexane or petroleum ether for separating the solid products of this invention. This product containing about 5 to about 10 wt. pct. phosphorus can then be broken up, dried, and reprecipitated if desired.

In another example of this invention, styrene polymers containing an unsaturated hydrocarbon content can be utilized in place of homopolymer styrene. The hydrocarbon content can occur in a random or block sequence with respect to the styrene. Examples include such polymers as Kraton $G^R$ which is a styrene-olefin-styrene block structure, or styrene isobutylene copolymers manufactured by Shell Oil Company, Houston, Texas.

It should be understood that the ingredients of this invention can be mixed in a different order than set forth above without departing from this invention.

The method of this invention is further described in the following examples:

Phosphorylation of Polystyrene

To effect conversion to the phosphorylated derivative 2500 cc (1.91 mole) of diethylphosphite (DEP) was first combined with 2000 cc of toluene at room temperature and 40 g of sodium metal (1.74 mole) was added to convert the DEP to its sodium salt. Evolution of hydrogen gas occurred, and after the sodium metal was completely digested, 100 g of chloromethylated polystyrene No. 14 ((CMPS-14) 0.322 mole $CH_2Cl$) were added to the phosphite salt solution and reacted for 7 hours at 60° to 70 °C (the CMPS can be predissolved in a portion of the toluene solvent before addition). The resulting mass (phosphorylated polystyrene sample No. 11) was precipitated from water with vigorous stirring and formed a two-layer system upon standing. The bottom layer, containing extracted salts, was discarded. The top layer, consisting of solvent swollen polymer, was added with stirring to hexane to obtain a solid product. This material was broken up, dried, and reprecipitated in a similar fashion. The structure of the polymer was verified by infrared spectroscopic analysis and elemental analysis which indicated 7.5 wt. pct. phosphorus content.

Further examples of this technique are summarized in Table II.

TABLE II

PHOSPHORYLATION OF CHLOROMETHYLATED POLYSTYRENE
PHOSPHORYLATION REACTIONS

| PS Series | CMPS (No.) | (Moles $CH_2Cl$) | Phosphite (Type) | (Moles) | Solvent (Type) | (mls) | Temp. (°C) | Time (Hrs.) | % Chlorine Residual | %Conversion Based upon % Chlorine |
|---|---|---|---|---|---|---|---|---|---|---|
| Phosphorylated Polystyrene-4 | 6 | 0.022 | Sodium diethyl Phosphite | 0.200 | Toluene | 260 | 60 | 6.25 | 0 | 99% |
| Phosphorylated Polystyrene-9 | 11 | 0.012 | Sodium diethyl Phosphite | 0.042 | Toluene | 50 | 60 | 6.5 | 0.40 | 98 |
| Phosphorylated Polystyrene-18 | 16 | 0.54 | Sodium diethyl Phosphite | 1.35 | Toluene | 2225 | 60 | 7.0 | 0.13* | 99 |
| Phosphorylated Polystyrene-19 | 17 | 0.895 | Sodium diethyl Phosphite | 3.13 | Toluene | 2500 | 60 | 7.0 | 0.26** | 99 |
| Phosphorylated Polystyrene-20 | 17 | 0.403 | Sodium diethyl Phosphite | 1.41 | Toluene | 1125 | 60 | 7.5 | 0.07*** | 99 |

*% Na = 0.20
**% Na = 0.54
***% Na = 0.22

Examples of the phosphorylation of chloromethylated styrene-olefin-styrene copolymer are given in Table III.

Flammability properties of phosphorylated polystyrene No. 11 were determined using the Oxygen Index test and modified Underwriters Laboratory Bulletin 94

TABLE III

PHOSPHORYLATION OF CHLOROMETHYLATED POLY (STYRENE-OLEFIN-STYRENE) BLOCK COPOLYMERS

| Phosphorylated Styrene-Olefin-Styrene | CMSOS (No.) | (Moles Chloromethyl) | Phosphite (Type) | (Moles) | Solvent (Type) | (mls) | Temp. (°C) | Time (Hr.) | % Chlorine Residue | % Conversion Based upon % Chlorine |
|---|---|---|---|---|---|---|---|---|---|---|
| PSOS-1 | 2 | 0.0015 | Sodium dibutyl phosphite | 0.0025 | φ | 17.5 | 50 | 6.0 | 3.45 | 5.0 Chlorine initially |
| PSOS-10 | 4 | 0.024 | Sodium diethyl phosphite | 0.40 | φCH₃ | 525 | 70 | 7.5 | nil | >99 |
| PSOS-11 | 4 | 0.024 | Sodium diethyl phosphite | 0.40 | φCH₃ | 525 | 60 | 0.15 | 0.15 | 96 |

Samples PSOS 10, 11, run at recommended phosphite salt to chloromethyl group ratios above 2.0, again exhibited virtually complete conversion to the desired phosphonate derivative. Sample PSOS 1, run using sodium dibutyl phosphite, demonstrates the reactivity of this alternative phosphorylating reagent. In this case, however, the salt to chloromethyl ratio was 1.67 and was less than the recommended minimum of 2.0. Thus, considerable chlorine, indicative of incomplete reaction, remains in the product.

Processing and Properties of Phsophorylated Polystyrene

Phosphorylated polystyrene polymer powders were first vacuum dried at 60°C, extruded at 160°C and then reground for final molding. Thus, flex bars of phosphorylated polystyrene No. 11 were molded on a 1.5 oz Newbury screw machine at a set temperature of 370°F. Flex bars and tensile bars of phosphorylated polystyrene 19 were molded at 320°F while samples of unmodified polystyrene were molded at 410°F. A product of the Ciba-Geigy Company, Irganox 1076, at 0.1 wt. pct., was added as a processing stabilizer.

A blend of 20 wt. pct. of Owens-Corning Fiberglas No. 885AB 0.25 inch glass fiber and 80 wt. pct. phosphorylated polystyrene No. 20 was injection molded at 340°F to yield flex test specimens.

The properties shown in Table IV were observed for polystyrene, phosphorylated polystyrene No. 19, and phosphorylated polystyrene No. 20 with 20 wt. pct. glass fibers.

test. Char stability under a condition of prolonged heat flux was examined by exposing solid 2 g samples of phosphorylated polystyrene No. 11 in a 2-inch Meeker burner flame for 10 seconds, 10 seconds, 10 seconds and 30 seconds (60 seconds total immersion) and reweighing the samples after each ignition.

Injection molded test bars of phosphorylated polystyrene No. 11 were treated for two 10-second ignitions by a 2-inch Bunsen burner flame applied to the top and to the bottom of vertically mounted samples and to the edge of a horizontally mounted sample. One 30-second ignition was applied to the bottom of a vertically mounted sample. In all geometries examined, the samples foamed up, were self-extinguishing and formed hard, self-supporting, carbaceous surface chars at the point of flame contact.

The results of Oxygen Index and char-stability determinations are given in Table V and confirm the excellent char-forming capacity and resistance of the phosphorylated polystyrene structures to open flame. The intumescent char structure and solid, uncombusted interior were significant. In contrast, underivatized polystyrene were rapidly converted into burning droplets.

TABLE V

EFFECT OF REPEATED FLAME CONTACT ON PHOSPHORYLATED POLYSTYRENE Vs. UNMODIFIED POLYSTYRENE*

| | NET WT LOSS (%) | | | | | |
|---|---|---|---|---|---|---|
| | PPS-11 | | PPS-19 | | GPS | |
| | (1) | (2) | (1) | (2) | (1) | (2) |
| 10" Ignition No.1 | 1.5 | 2.9 | 5.8 | 3.4 | 65.1 | 51.3 |
| 10" Ignition No.2 | 3.0 | 5.4 | 10.6 | 6.0 | 96.9 | 76.4 |

TABLE IV

COMPARATIVE MECHANICAL PROPERTIES OF PHOSPHORYLATED POLYSTYRENE OF THIS INVENTION Vs. UNMODIFIED POLYSTYRENE

| Property | Phosphorylated Polystryene-19 | Phosphorylated Polystyrene-20* ** (20%) Glass | Polystyrene |
|---|---|---|---|
| Yield Strength (psi) | Ruptures w/o yielding | | 7,791 |
| Elongation at yield (%) | — | | 3.15 |
| Rupture Strength (psi) | 3,577 | | 7,604 |
| Elongation at rupture (%) | 1.43 | | 3.95 |
| Tangent Modulus (×10⁵ psi) | 3.18 | | 5.00 |
| 0.5% secant modulus (×10⁵ psi) | 3.18 | | 5.00 |
| 1.0% secant modulus (×10⁵ psi) | 2.97 | | 4.69 |
| Flexural Strength (psi) | 8,359 | 12,415 | 16,680 |
| Flexural Modulus (×10⁵ psi) | 2.74 | 5.56 | 4.94 |
| 0.1" secant modulus (×10⁵ psi) | 2.74 | 5.31 | 4.94 |
| 10 mil Notched Izod Impact (ft-lb/in notch) Avg. of 2 | 0.26 | 1.23 | 0.53 |
| Optical Softening Range | 135–140°C | | — |

*Average of two specimens — values varied 10%
**Same level of substitution as phosphorylated polystyrene-19

TABLE V-continued
EFFECT OF REPEATED FLAME CONTACT ON PHOSPHORYLATED POLYSTYRENE Vs. UNMODIFIED POLYSTYRENE*

| | NET WT LOSS (%) | | | | | |
|---|---|---|---|---|---|---|
| | PPS-11 | | PPS-19 | | GPS | |
| | (1) | (2) | (1) | (2) | (1) | (2) |
| 10" Ignition No.3 | 4.6 | 6.0 | 13.6 | 8.2 | 98.2 | 91.6 |
| 30" Ignition | 16.0 | 21.0 | 25.2 | 18.6 | 99.0 | 99.0 |
| Oxygen Index | 25.3 | | 24.1 | | 18.5 | |

*2g samples immersed in open two-inch Meeker burner flame

Other modifications and alterations of this invention will become apparent to those skilled in the art from the foregoing discussion, and it should be understood that this invention is not to be unduly limited thereto.

What is claimed is:

1. A copolymer of styrene and phosphorylated styrene, said copolymer containing phenyl groups and being represented by the formula

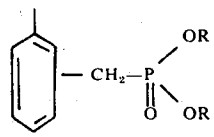

where R is an alkyl group having 1–8 carbon atoms of the group consisting of alkyl and at least about 5 wt. pct. phosphorus, said phosphorus being bonded to the phenyl group by an intervening methylene group and said polystyrene copolymer being substantially non-crosslinked.

2. A copolymer, as set forth in claim 1, wherein said phosphorus is present in an amount in the range of about 5 to about 10 wt. pct.
3. A copolymer, as set forth in claim 1, wherein R is ethyl.
4. A copolymer, as set forth in claim 1, wherein R is butyl.
5. A copolymer, as set forth in claim 1, wherein the phosphorus is in the form of a phosphonate.
6. A copolymer, as set forth in claim 5, wherein the carbon-phosphorus bond of the phosphonate is connecting the phosphorus to the phenyl group.
7. A copolymer, as set forth in claim 1, including glass fibers in an amount in the range of about 5 to about 50 wt. pct.

* * * * *